(12) United States Patent
Lickfelt et al.

(10) Patent No.: US 10,118,594 B2
(45) Date of Patent: Nov. 6, 2018

(54) SYSTEM AND METHOD FOR REDUCING POWER CONSUMPTION FOR A SMART ENTRY DOOR HANDLE IN A VEHICLE

(71) Applicant: Honda Motor Co., Ltd., Tokyo (JP)

(72) Inventors: Brian K. Lickfelt, Powell, OH (US); Jason D. DiSalvo, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 431 days.

(21) Appl. No.: 14/831,922

(22) Filed: Aug. 21, 2015

(65) Prior Publication Data

US 2017/0050618 A1    Feb. 23, 2017

(51) Int. Cl.
B60R 16/03    (2006.01)
B60R 25/40    (2013.01)

(52) U.S. Cl.
CPC ............ B60R 25/403 (2013.01); B60R 16/03 (2013.01)

(58) Field of Classification Search
CPC .............................. B60R 16/03; B60R 25/403
See application file for complete search history.

(56) References Cited

U.S. PATENT DOCUMENTS

| | | | |
|---|---|---|---|
| 5,973,611 A | 10/1999 | Kulha et al. | |
| 6,236,333 B1 * | 5/2001 | King | B60R 25/2036 340/10.1 |
| 6,552,649 B1 | 4/2003 | Okada et al. | |
| 6,847,289 B2 | 1/2005 | Pang et al. | |
| 7,190,253 B2 * | 3/2007 | Shimomura | B60R 25/1004 340/12.51 |
| 7,471,187 B2 * | 12/2008 | Nakashima | B60R 25/246 307/10.1 |
| 8,203,424 B2 * | 6/2012 | Ghabra | G07C 9/00309 340/5.6 |
| 8,222,993 B2 | 7/2012 | Bliding et al. | |
| 8,242,886 B2 | 8/2012 | Murakami | |
| 8,593,249 B2 | 11/2013 | Bliding et al. | |
| 9,437,064 B1 * | 9/2016 | Ghabra | G07C 9/00309 |
| 2003/0216817 A1 * | 11/2003 | Pudney | E05B 81/78 700/17 |
| 2006/0012462 A1 | 1/2006 | Teshima et al. | |
| 2006/0030973 A1 * | 2/2006 | Brillon | G07C 9/00309 701/1 |
| 2007/0018790 A1 | 1/2007 | Lafrance | |
| 2009/0085720 A1 * | 4/2009 | Kurpinski | B60R 25/246 340/5.64 |
| 2014/0020437 A1 * | 1/2014 | Bliding | E05B 49/00 70/283.1 |
| 2014/0022054 A1 * | 1/2014 | Bliding | E05B 49/00 340/5.61 |

(Continued)

*Primary Examiner* — Thomas G Black
*Assistant Examiner* — Ce Li Li
(74) *Attorney, Agent, or Firm* — Rankin, Hill & Clark LLP (57) ABSTRACT

A method and system for reducing power consumption for a smart entry door handle in a vehicle is provided. The method and system include determining if a portable device is located within a polling range of the vehicle. The method and system further include supplying a first predetermined amount of power to a smart entry door handle if it is determined that the portable device is located within a polling range of the vehicle. The method and system also include supplying a second predetermined amount of power to the smart entry door handle if it is determined that the portable device is located outside of the polling range of the vehicle.

16 Claims, 4 Drawing Sheets

(56) References Cited

U.S. PATENT DOCUMENTS

2015/0002263 A1* 1/2015 Ayeva ................. G07C 9/00111
  340/5.61
2015/0274126 A1* 10/2015 Nishiyama ............ B60R 25/245
  701/2

* cited by examiner

SYSTEM AND METHOD FOR REDUCING POWER CONSUMPTION FOR A SMART ENTRY DOOR HANDLE IN A VEHICLE

BACKGROUND

Many vehicles today include smart entry systems for locking and unlocking vehicle doors. Many of these smart entry systems require a high amount of power that is utilized to operate components of the smart entry systems such as capacitive sensors and/or input buttons. Many of these components are constantly enabled regardless of whether they are going to be utilized to lock or unlock the vehicle doors anytime soon. Additionally, the components utilized to sense the user's touch and/or send a signal to a key fob of the smart entry system draw a higher amount of constant power than may be needed regardless of if they are going to be utilized anytime soon. Over time, this unnecessary power consumption can cause the spending of a high amount of a quiescent energy which can cause a decrease in vehicle battery charge and a resulting decrease in vehicle fuel economy, as an alternator of the vehicle is utilized to replace the unnecessary lost battery charge.

SUMMARY

According to one aspect, a computer implemented method for reducing power consumption for a smart entry door handle in a vehicle is provided. The method includes determining if a portable device is located within a polling range of the vehicle. The method further includes supplying a first predetermined amount of power to a smart entry door handle if it is determined that the portable device is located within the polling range of the vehicle. The method also includes supplying a second predetermined amount of power to the smart entry door handle if it is determined that the portable device is located outside of the polling range of the vehicle.

According to a further aspect, a system for power consumption for a smart entry door handle in a vehicle. Specifically, in accordance with this aspect, the system includes a smart entry power control application for controlling components of the smart entry door handle. The system further includes a polling signal response module of the smart entry control application for determining if a portable device is located within a polling range of the vehicle. The system also includes a power supply unit of the vehicle for supplying a first predetermined amount of power to a smart entry door handle if the polling signal response module determines that the portable device is located within the polling range of the vehicle. The power supply unit of the vehicle supplies a second predetermined amount of power to a smart entry door handle if the polling signal response module determines that the portable device is located outside of the polling range of the vehicle.

According to still another aspect, a non-transitory computer-readable storage medium is provided that stores instructions that, when executed by a computer, causes the computer to perform a method. The instructions include determining if a portable device is located within a polling range of a vehicle. The instructions further include supplying a first predetermined amount of power to a smart entry door handle if it is determined that the portable device is located within the polling range of the vehicle. The instructions also include supplying a second predetermined amount of power to the smart entry door handle if it is determined that the portable device is located outside of the polling range of the vehicle.

DETAILED DESCRIPTION

The following includes definitions of selected terms employed herein. The definitions include various examples and/or forms of components that fall within the scope of a term and that can be used for implementation. The examples are not intended to be limiting.

A "bus," as used herein, refers to an interconnected architecture that is operably connected to transfer data between computer components within a singular or multiple systems. The bus can be a memory bus, a memory controller, a peripheral bus, an external bus, a crossbar switch, and/or a local bus, among others. The bus can also be a vehicle bus that interconnects components inside a vehicle using protocols such as Controller Area network (CAN), Media Oriented System Transport (MOST), Local Interconnect Network (LIN), among others.

"Computer communication", as used herein, refers to a communication between two or more computing devices (e.g., computer, personal digital assistant, cellular telephone, network device) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device" as used herein can include devices for controlling different vehicle features which include various vehicle components, systems, and subsystems. The term "input device" includes, but it not limited to: push buttons, rotary knobs, and the like. The term "input device" additionally includes graphical input controls that take place within a user interface which can be displayed by various types of mechanisms such as software and hardware based controls, interfaces, or plug and play devices.

A "memory," as used herein can include volatile memory and/or nonvolatile memory. Non-volatile memory can include, for example, ROM (read only memory), PROM (programmable read only memory), EPROM (erasable PROM) and EEPROM (electrically erasable PROM). Volatile memory can include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module", as used herein, includes, but is not limited to, hardware, firmware, software in execution on a machine, and/or combinations of each to perform a function(s) or an action(s), and/or to cause a function or action from another module, method, and/or system. A module can include a software controlled microprocessor, a discrete logic circuit, an analog circuit, a digital circuit, a programmed logic device, a memory device containing executing instructions, and so on.

An "operable connection," as used herein can include a connection by which entities are "operably connected", is one in which signals, physical communications, and/or logical communications can be sent and/or received. An operable connection can include a physical interface, a data interface and/or an electrical interface.

An "output device" as used herein can include devices that can derive from vehicle components, systems, subsystems, and electronic devices. The term "output devices" includes, but is not limited to: display devices, and other devices for outputting information and functions.

A "processor", as used herein, processes signals and performs general computing and arithmetic functions. Signals processed by the processor can include digital signals, data signals, computer instructions, processor instructions, messages, a bit, a bit stream, or other means that can be received, transmitted and/or detected. Generally, the processor can be a variety of various processors including multiple single and multicore processors and co-processors and other multiple single and multicore processor and co-processor architectures. The processor can include various modules to execute various functions.

A "vehicle", as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system", as used herein can include, but are not limited to, any automatic or manual systems that can be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

I. System Overview

Figure 1:
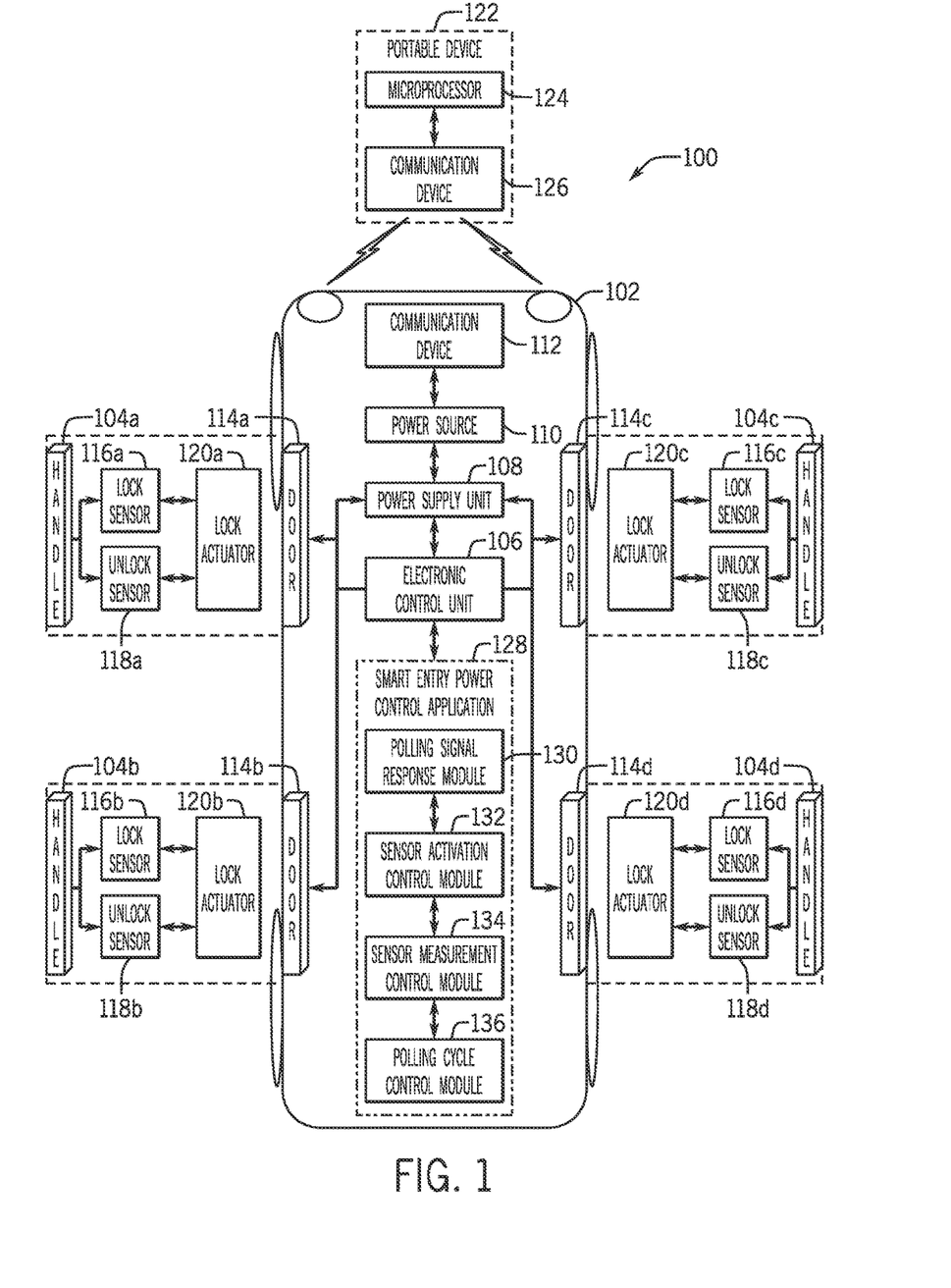
FIG. 1 shows is schematic view of an exemplary operating environment of a smart entry power control system for reducing the amount of power consumed by the components of smart entry door handles in a vehicle according to an exemplary embodiment of the present disclosure.

Generally, the systems and methods disclosed herein provide control of supply of vehicle power to smart entry door handles of a vehicle in order to reduce consumption of quiescent power from a power source (e.g., vehicle battery) of the vehicle. Referring now to the drawings, wherein the showings are for purposes of illustrating one or more exemplary embodiments and not for purposes of limiting the same, FIG. 1 shows a schematic view of an exemplary operating environment of a smart entry power control system 100 for reducing the amount of power consumed by the components of smart entry door handles 104a-104d in a vehicle 102 according to an exemplary embodiment of the present disclosure. The components of the system 100, as well as the components of other systems, hardware architectures and software architectures discussed herein, can be combined, omitted or organized into different architecture for various embodiments. However, the exemplary embodiments discussed herein focus on the environment as illustrated in FIG. 1, with corresponding system components, and related methods.

The vehicle 102 of the smart entry power control system 100 includes an electronic control unit (ECU) 106, a power supply unit 108, a power source 110, a communication device 112 and vehicle doors 114a-114d that include the smart entry door handles 104a-104d. In an exemplary embodiment, the smart entry door handles 104a-104d are part of an overall smart entry door system (not shown) that can include components, vehicle software, remote devices, and/or remote software.

In an exemplary embodiment, the ECU 106 operably controls the vehicle systems, components, and features. The ECU 106 can include a microprocessor, one or more application-specific integrated circuit(s) (ASIC), or other similar devices. The ECU 106 can also include internal processing memory, an interface circuit, and bus lines for transferring data, sending commands, and communicating with the systems and components of the vehicle 102. Generally, the ECU 106 includes a processor and memory (not shown). The ECU 106 also includes a communication device (not shown) for sending data internally in the vehicle 102.

In some embodiments, the ECU 106 can include numerous ASICs that control operation of corresponding vehicle systems and components. The ASICs can provide load consumption requirements for each of the corresponding vehicle systems and components to the power supply unit 108 in the form of commands. In an exemplary embodiment, the ECU 106 includes a smart entry system application-specific integrated circuit (not shown) (smart entry ASIC) that is utilized to control the components of the smart entry door handles 104a-104d. The smart entry system ASIC can be in the form of an integrated circuit that is embedded as part of the ECU 106. The smart entry ASIC can include its own microprocessor and memory.

In an exemplary embodiment, the ECU 106 and/or the smart entry ASIC stores and/or executes a smart entry power control application 128 that sends commands to the power supply unit 108 of the vehicle 102 to control the amount of power supplied from the power source 110 to one or more components of the smart entry door handles 104a-104d and the communication device 112 of the vehicle 102. As shown in FIG. 1, the smart entry power control application 128 includes modules 130-136 that are utilized to operate the components of the smart entry door handles 104a-104d. As discussed below, the modules 130-136 of the smart entry power control application 128 are utilized to enable, disable, and/or modify the operation of one or more components of the smart entry door handles 104a-104d to utilize various power consumption levels based on the determination that (a user(s) carrying) one or more portable devices 122 are or are not in proximity of the vehicle 102. For instance, the one or more modules 130-136 can communicate one or more commands to the power supply unit 108 in order to supply one or more predetermined amounts of power from the power source 110 (e.g., vehicle battery, alternator) to various systems and components of the vehicle 102.

The communication device 112 of the vehicle 102 is also connected to the ECU 106. In one embodiment, the communication device 112 includes or is a transceiver that is capable of providing wireless computer communications utilizing various protocols to be utilized to send/receive electronic signals internally to components and systems within the vehicle 102 and to external devices including one or more portable devices 122.

The one or more portable devices 122 can be one or more of electronic key fobs, smart keys, mobile electronic devices, remote controls, and the like. Several functions of the smart entry door handles 104a-104d can be controlled by user input that is provided on one or more portable devices 122 that influence and/or command the ECU 106 and/or the included smart entry ASIC to control the components of the smart entry door handles 104a-104d based on wireless computer communication between the portable device(s) 122 and the vehicle 102.

The portable device(s) 122 includes a communication device 126 that is utilized to send and receive electronic signals to and from the vehicle 102. The communication device 126 includes or is a transceiver that is capable of providing wireless computer communications utilizing various protocols to be utilized to send/receive electronic signals and to external devices including the communication device 112 of the vehicle 102. The electronic signals can include command signals to one or more vehicle systems and/or components. In one embodiment, the electronic signals can include polling signals that are sent from the vehicle 102 in order to determine if the portable device(s) 122 is in a predetermined vicinity of the vehicle 102. In another embodiment, the electronic signals can include polling response signals to communicate the receipt of a polling signal to the vehicle 102 to confirm the existence or presence of the portable device 122 in a predetermined vicinity of the vehicle 102.

The portable device(s) 122 can also include a microprocessor 124 that includes memory, an interface circuit, and bus lines, for transferring data, sending commands, communicating with the various components and controlling an overall operation of the portable device(s) 122. In one embodiment, the microprocessor 124 can store a specific identification code that specifically corresponds to the portable device(s) 122 to be used as an identification mechanism by the vehicle 102. In an alternate embodiment, the microprocessor 124 can store a vehicle identification number (VIN) of the vehicle 102 or an identification code that is associated to the vehicle 102 that is paired to the portable device 122.

In an exemplary embodiment, the communication device 112 of the vehicle 102 is utilized to send the polling signal that is sent out from the vehicle 102 in order to sense the presence of the portable device(s) 122 in a predetermined vicinity of the vehicle 102 defined as a polling range of the vehicle 102. The communication device 112 of the vehicle 102 transmits the polling signal by sending a predetermined number of transmissions of the polling signal within a predetermined time period. The polling signal can be sent in an intermittent manner for an unlimited predetermined period of time. For example, the communication device 112 can send one polling signal every second to the portable device(s) 122.

In operation, a polling signal response module 130 of the smart entry power control application 128 on the vehicle 102 determines if the one or more portable devices 122 that are paired or that correspond to the vehicle 102 are located within a polling range of the vehicle 102. In one embodiment, the polling signal response module 130 makes a determination that the portable device(s) 122 is within a polling range of the vehicle 102 based on if the portable device(s) 122 receiving the polling signal sent from the vehicle 102. This determination by the polling signal response module 130 that the portable device(s) 122 are within or not within (outside) of the polling range can be utilized in order to activate and/or deactivate certain vehicle components and/or systems. For example, if it is determined that the portable device(s) 122 enters into the polling range of the vehicle 102, components of a lighting system (not shown) that provide a 'welcome lighting' function can be enabled when the portable device(s) 122 are determined to enter the polling range of the vehicle 102. In another example, if is determined that the portable device(s) 122 are within the polling range of the vehicle 102 upon an occupant of the vehicle 102 exiting the vehicle 102, the components of the smart entry handles 104a-104d can lock the vehicle doors 114a-114d when it is determined that the portable device(s) 122 are no longer within the polling range of the vehicle 102.

In one embodiment, the polling range can be defined by the area between the perimeter of the vehicle 102 and a predetermined distance (outward) from the vehicle 102 where the portable device(s) 122 are capable of receiving the polling signal. As will be described in more detail below, the ECU 106 can send commands to the power supply unit 108 to supply one or more predetermined amounts of average power to the smart entry door handles 104a-104d based on the determination by the polling signal response module 130 that the portable device(s) 122 is located within the polling range of the vehicle 102.

In one embodiment, when the communication device 126 of the portable device(s) 122 receives the polling signal sent from the vehicle 102, the communication device 126 sends the polling response signal to the communication device 112 of the vehicle 102. The polling response signal can include the identification code associated to the portable device(s) 122. The ECU 106 can include internal storage memory (not shown) that can contain a list of one or more identification codes of a paired/corresponding portable device(s) 122. Upon the communication device 112 receiving the polling response signal from the portable device(s) 122, the polling signal response module 130 identifies matching identification codes and determines if the polling response signal received from the portable device(s) 122 is from the paired/corresponding portable device(s) 122. If the vehicle 102 receives a response polling signal from the paired/corresponding portable device(s) 122 based on the matching of the identification codes, the polling signal response module 130 determines that the portable device(s) 122 is located within polling range of the vehicle 102. Alternatively, if the vehicle 102 does not receive the polling response signal from the paired/corresponding portable device(s) 122, the polling signal response module 130 determines that the paired/corresponding portable device(s) 122 is not within the polling range of the vehicle 102 and is therefore outside of the polling range of the vehicle 102.

In another embodiment, the vehicle 102 can include a proximity sensor that can be utilized to determine when the portable device(s) 122 is located within a predetermined vicinity (proximity) of the vehicle 102 defined as the polling range. The proximity sensor may emit an electromagnetic field to identify the approach of the user(s) carrying the portable device(s) 122 within an area defined as the polling range of the vehicle 102. The proximity sensor can be utilized in conjunction with the communication device 126 to confirm that the paired/corresponding portable device(s) 122 is within the polling range of the vehicle 102.

In an exemplary embodiment of the smart entry power control system 100 shown in FIG. 1, the smart entry door handle 104 can be included at a driver's door 114a. Additionally, the smart entry door handles 104b-104d can be included at passenger doors 114b-114d. In one embodiment, the smart entry door handles 104a-104d include lock sensors 116a-116d and unlock sensors 118a-118d. The lock sensors 116a-116d and unlock sensors 118a-118d can include capacitive touch sensors that are capable of receiving inputs to put respective lock actuators 120a-120d included as components of the smart entry door handles 104a-104d in locked and unlocked modes. The lock sensors 116a-116d and unlock sensors 118a-118d can be displaced on an inside and/or outside portion of smart entry door handles 104a-104d in order for a user to utilize them efficiently. For instance, when a front passenger exits the vehicle 102, the occupant can touch input the lock sensor 116c that is disposed on the outside portion of the smart entry door handle 104c in order to lock the passenger's door 114c. Similarly, the passenger may touch input the unlock sensor 118c that is disposed on the inside portion of the smart entry door handle 104c upon returning to the vehicle 102 in order to unlock the passenger's door 114c. In an alternate embodiment, the smart entry door handles 104a-104d can include a lock and/or unlock input button (not shown) in place of one or both of the lock sensors 116a-116d and/or unlock sensors 118a-118d. The lock and/or unlock input buttons can be inputted by an occupant of the vehicle 102 to lock or unlock the doors 114a-114d of the vehicle 102. In yet another embodiment, the smart entry door handles 104a-104d can each include a single touch sensor and/or a signal input button (in lieu of separate lock and unlock sensors/input buttons). The single touch sensor and/or input button can be utilized to lock the doors 114a-114d when the lock actuators 120a-120d are in an unlocked state. In addition, the single touch sensor and/or input button can be utilized to unlock the doors 114a-114d when the lock actuators 120a-120d are in a locked state.

In one embodiment, upon determining that the portable device(s) 122 is located within the polling range of the vehicle 102, the polling signal response module 130 sends a command to operate the components of the smart entry door handles 104a-104d and the communication device 112 of the vehicle 102 based on a first predetermined amount of power. As discussed in more detail below, the smart entry door handles 104a-104d and the communication device 112 consume the first predetermined amount of power that is supplied by the power source 110 and controlled by the power supply unit 108 as dictated by the one or more modules 130-136 of the smart entry power control application 128.

In one embodiment, upon receipt of the command to operate the components of the smart entry door handles 104a-104d with the first predetermined amount of power, the ECU 106 can command the power supply unit 108 to operate in a default powering mode wherein a default amount of average power (current) is supplied to the components of the smart entry door handles 104a-104d. For example, the default amount of power can include a maximum amount of power that is needed to operate the one or more components of the smart entry door handles 104a-104d. In addition, upon receipt of the command to operate with the first predetermined amount of power, the ECU 106 can command the power supply unit 108 to operate in a power saving mode wherein a reduced amount of average power (current) is supplied to the communication device 112 of the vehicle 102. As described in more detail below, the reduced amount of power consumes less power than the default amount of power consumed by the communication device 112 of the vehicle 102 during the default powering mode.

In one embodiment, upon determining that the portable device(s) 122 is located outside of the polling range of the vehicle 102, the polling signal response module 130 sends a command to the ECU 106 to operate the components of the smart entry door handles 104a-104d and the communication device 112 of the vehicle 102 based on a second predetermined amount of power. As discussed in more detail below, the smart entry door handles 104a-104d and the communication device 112 consume the second predetermined amount of power that is supplied by the power source 110 and controlled by the power supply unit 108 as dictated by the one or more modules 130-136 of the smart entry power control application 128.

In one embodiment, upon receipt of the command to operate the components of the smart entry door handles 104a-104d with the second predetermined amount of power, the ECU 106 can command the power supply unit 108 to operate in the power saving mode wherein a reduced amount of power is supplied to the components of the smart entry door handles 104a-104d. When the smart entry door handles 104a-104d operate in the power saving mode, the smart entry door handles 104a-104d consume less power than the default amount of power consumed by the smart entry door handles 104a-104d during the default powering mode. In particular, when the user carrying the portable device(s) 122 is located outside of the polling range of the vehicle 102, the smart door entry handles 104a-104d operates in the power saving mode to ensure that the power source 110 can supply less power (than the maximum power needed) to operate the components of the smart entry door handles 104a-104d until the user carrying the portable device(s) 122 is located within the polling range as the user approaches the vehicle 102. For example, in the default power mode, the smart entry door handles 104a-104d may utilize 1 mA per handle that is decreased approximately ten times within the power saving mode to 100 uA. As discussed in more detail below, upon receipt of the command to operate with the second predetermined amount of power the ECU 106 can command the power supply unit 108 to operate in the (higher) default power mode, wherein the default amount of power is supplied to the communication device 112 of the vehicle 102 and/or to the capacitive touch sensors of the smart entry door handles 104a-104d.

Referring again to the modules 130-136 of the smart entry power control application 128, a sensor activation control module 132 is also included. The sensor activation control module 132 controls the activation and the deactivation of the lock sensors 116a-116d and the unlock sensors 118a-118d independently or jointly based on the various factors. In one embodiment, the sensor activation control module 132 (jointly) activates and deactivates the lock sensors 116a-116d and the unlock sensors 118a-118d based on the determination by the polling signal response module 130 that the portable device(s) 122 are within or outside of the polling range of the vehicle 102.

Specifically, in this embodiment, if the polling signal response module 130 determines that the portable device(s) 122 is located within the polling range of the vehicle 102, the polling signal response module 130 sends a default operation command to the sensor activation control module 132 to utilize the first predetermined amount of power. Upon receipt of the default operation command, the sensor activation control module 132 sends a corresponding command to the power supply unit 108 in order to enable the supply of power to the lock sensors 116a-116d and unlock sensors 118a-118d. Therefore, the lock sensors 116a-116d and the unlock sensors 118a-118d are activated and only consume necessary power from the power source 110 of the vehicle 102 when the portable device(s) 122 are within the polling range of the vehicle 102. For example, if a driver carrying the portable device(s) 122 travels within the polling range, the lock sensor 116a and the unlock sensor 118a are activated since the driver may utilize the sensors 116a, 118a to lock or unlock the driver's door 114a.

Similarly, in this embodiment, if the polling signal response module 130 determines that the portable device(s) 122 are outside of the polling range of the vehicle 102, the polling signal response module 130 sends a power saving command to the sensor activation control module 132 to disable the supply of power to the lock sensors 116a-116d and unlock sensors 118a-118d. Upon receipt of the power saving command, the sensor activation control module 132 sends a corresponding command to the power supply unit 108 to initiate the power saving mode in order to disable the supply of power to the lock sensors 116a-116d and unlock sensors 118a-118d. Therefore, the lock sensors 116a-116d and the unlock sensors 118a-118d are not activated and do not consume any unnecessary power from the power source 110 of the vehicle 102 when the (user(s) carrying) the portable device(s) 122 is not within the polling range of the vehicle 102. For example, if a driver carrying the portable device(s) 122 is located outside of the polling range of the vehicle 102, the lock sensor 116a and the unlock sensor 118a are disabled since the driver will not be utilizing the lock sensor 116a and the unlock sensor 118a when the driver is away from the vehicle 102. Consequently, upon the driver traveling within the polling range of the vehicle 102, the lock sensor 116a and the unlock sensor 118a are enabled ("woken-up") since the driver may again utilize the lock sensor 116a or unlock sensor 118a when the driver is in close proximity to the vehicle 102 in order to unlock the driver's door 114a.

In an alternate embodiment, if the vehicle 102 uses a lock and/or unlock input button(s) in place of one or both of the lock sensors 116a-116d and/or unlock sensors 118a-118d, the sensor activation control module 132 can send corresponding commands based on the receipt of the default operation command or the power saving command from the polling signal response module 130 to enable and/or disable the supply of power to the lock and/or unlock input button(s) in order to activate and/or deactivate the lock and/or unlock input button(s).

In some embodiments, the sensor activation control module 132 can send commands to enable and/or disable power to the lock sensors 116a-116d and unlock sensors 118a-118d individually of one or more specific doors 118a-118d based on the locked or unlocked state of the lock actuators 120a-120d at each of the doors 114a-114d individually. Specifically, the ECU 106 can evaluate the lock status of each of the lock actuators 120a-120d and can send a command to the power supply unit 108 to disable the supply of power to one or more unlock sensors 118a-118d that correspond to lock actuators 120a-120d that are in an unlocked state and to enable the supply of power to the one or more corresponding lock sensors 116a-116d.

Similarly, the sensor activation control module 132 can send a command to the power supply unit 108 to disable the supply of power to one or more lock sensors 116a-116d that correspond to lock actuators 120a-120d that are in a locked state and to enable the supply of power corresponding unlock sensors 118a-118d. Therefore, the power source 110 does not unnecessarily supply power to the lock sensors 116a-116d when corresponding doors 114a-114d are locked or to the unlock sensors 118a-118d when corresponding doors 114a-114d are unlocked. For example, if the lock actuator 120d located at the rear passenger door 114d is in a locked state, the sensor activation control module 132 sends the command signal to the power supply unit 108 to disable the lock sensor 116d of the smart entry door handle 104d (since it will not be needed by the passenger). Similarly, if the lock actuator 120b located at the rear passenger door 114b is in an unlocked state, the sensor activation control module 132 sends the command signal to the power supply unit 108 to disable the unlock sensor 118a of the smart entry door handle 104b (since it will most likely not be utilized by the passenger).

As shown in the illustrated embodiment of FIG. 1, the smart entry power control application 128 also includes a sensor measurement control module 134. In an exemplary embodiment, the sensor measurement control module 134 controls a frequency of (touch/input) sensing measurements that are performed by the unlock sensors 118a-118d in order to receive a corresponding unlock input from the user(s). The sensor measurement control module 134 controls the frequency of the sensing measurements of the unlock sensors 118a-118d to increase or decrease the number of sensing measurements within a predetermined time period based on the determination by the polling signal response module 130 that the portable device(s) 122 is located within or outside of the polling range of the vehicle 102. In other words, the sensor measurement control module 134 controls the reaction time of the unlock sensors 118a-118d to provide a predetermined number of measurements during the predetermined time to provide a default (faster) reaction time (e.g., 5 ms) when the first predetermined amount of power is supplied to the unlock sensors 118a-118d. The number of measurements during the predetermined time are reduced which consequently increases the reaction time of the unlock sensors 118a-118d (e.g., from 5 ms to 30 ms) to provide an increased (slower) reaction time when the second predetermined amount of power is supplied to the unlock sensors 118a-118d.

Specifically, in this embodiment, if the polling signal response module 130 determines that the portable device(s) 122 are within the polling range of the vehicle 102, the polling signal response module 130 sends a default operation command to the sensor measurement control module 134 to utilize the first predetermined amount of power. Upon receipt of the default operation command, the sensor measurement control module 134 sends a corresponding command to the power supply unit 108 to initiate a default sensing measurement mode in order to supply an amount of power to the unlock sensors 118a-118d that is necessary for the unlock sensors 118a-118d to initiate the predetermined default number of sensing measurements within a predetermined period of time. Therefore, the sensor measurement control module 134 operates the unlock sensors 118a-118d to provide a predetermined default number of sensing measurements within the period of time (e.g., 5 ms) which are sufficient to activate the lock actuators 120a-120d of the smart entry door handles 104a-104d and only consumes necessary power from the power source 110 of the vehicle 102 when the (user(s) carrying) the portable device(s) 122 are within the polling range of the vehicle 102.

Alternatively, if the polling signal response module 130 determines that the portable device(s) 122 are outside of the polling range of the vehicle 102, the polling signal response module 130 sends the power saving command to the sensor activation control module 132 to utilize the second predetermined amount of power. Upon receipt of the power saving command, the sensor measurement control module 134 sends a corresponding command to the power supply unit 108 to initiate a reduced sensing measurement mode in order to reduce the supply of power to the unlock sensors 118a-118d to initiate a reduced number of sensing measurements within the predetermined time period than in the default measurement mode, discussed above. Therefore, the unlock sensors 118a-118d consume a reduced amount of power as unnecessary power does not need to be supplied from the power source 110 in order to provide a higher number of sensing measurements (i.e., a faster sensing reaction time) within the predetermined time period from the power source 110 of the vehicle 102 when the (user(s) carrying) the portable device(s) 122 is not within the polling range of the vehicle 102. The sensor measurement control module 134 ensures that the power source 110 only supplies the default (higher) level of power to operate the unlock sensors 118a-118d in the default sensing measurement mode specifically when there will be a higher propensity that the user will utilize the unlock sensors 118a-118d (when the user is within the polling range of the vehicle 102). Consequently, the reaction time of the unlock sensors 118a-118d is increased (e.g., from 5 ms to 30 ms) when the second predetermined amount of power is supplied to the unlock sensors 118a-118d.

In another embodiment, the sensor measurement control module 134 controls a frequency of (touch/input) sensing measurements that are performed by the lock sensors 116a-116d and the unlock sensors 118a-118d in order to receive corresponding lock and unlock inputs from the user(s). The sensor measurement control module 134 controls the frequency of the sensing measurements of the lock sensors 116a-116d and unlock sensors 118a-118d together to increase or decrease the number of sensing measurements within a predetermined time period based on the determination by the polling signal response module 130 that the portable device(s) 122 is located within or located outside of the polling range of the vehicle 102.

As shown in the illustrated embodiment of FIG. 1, the smart entry power control application 128 also includes a polling cycle control module 136. The polling cycle control module 136 controls a frequency of polling signal transmissions that are transmitted by the communication device 112 of the vehicle 102 to the communication device(s) 126 of the portable device(s) 122 during a predetermined time period. In other words, the polling cycle control module 136 sends one or more commands to the communication device 112 to send one or more predetermined number of polling signal transmissions during the predetermined time period to the communication device(s) 126 of the portable device(s) 122 in order to determine if the portable device(s) 122 are within the polling range of the vehicle 102.

In one embodiment, the polling cycle control module 136 controls the frequency of the polling signal transmissions to increase or decrease the number of polling signal transmissions within the predetermined period of time based on the determination by the polling signal response module 130 that the portable device(s) 122 is located outside or located within the polling range of the vehicle 102. In operation, the polling cycle control module 136 sends a command to the power supply unit 108 to control the supply of power from the power source 110 to the communication device 112 to provide a default (higher) number of polling signal transmissions (e.g., one per every 60 ms) based on the supply of a second predetermined amount of power to the communication device 112 when the portable device(s) 122 is located outside the polling range of the vehicle 102. In addition, the polling cycle control module 136 sends a command to the power supply unit 108 to control the supply of power from the power source 110 to the communication device 112 to provide a reduced (lower) number of polling signal transmissions (e.g., one per every second as the portable device(s) 122 is moving away from the vehicle 102, or one per every 12 seconds when the portable device(s) 122 are approaching the vehicle 102) based on the supply of a first predetermined amount of power to the communication device 112 when the portable device(s) 122 is located within the polling range of the vehicle 102.

Therefore, unlike the amount of power supplied to the components of the smart entry door handles 104a-104d discussed above, the second predetermined amount of power is higher than the first predetermined amount of power when provided to the communication device 112 of the vehicle 102 based on the polling cycle control module 136. Supplying a higher level of power when the second predetermined amount of power is provided to the communication device 112 can be beneficial in order to quickly determine when the portable device(s) 122 may enter the polling range (when the portable device(s) 122 are outside of the polling range of the vehicle 102) in order to efficiently enable the lock sensors 116a-116d, unlock sensors 118a-118d, and/or increase the frequency of sensing measurements that are performed by the unlock sensors 118a-118d. Accordingly, the polling cycle control module 136 ensures that the communication device 112 consumes a reduced amount of power when the portable device(s) 122 is located within the polling range.

Specifically, in this embodiment, if the polling signal response module 130 determines that the portable device(s) 122 are outside of the polling range of the vehicle 102, the polling signal response module 130 sends the default operation command to the polling cycle control module 136 to utilize the second predetermined amount of power. Upon receipt of the default operation command, the polling cycle control module 136 sends a corresponding command to the power supply unit 108 to initiate a default polling mode to enable the supply of power to the communication device 112 in order to transmit the predetermined default number of transmissions of the polling signal within a predetermined time period. Therefore, the polling cycle control module 136 operates the communication device 112 to provide a predetermined default number of polling signal transmissions within the predetermined period of time which are sufficient to quickly determine if the portable device(s) 122 enter the polling range of the vehicle 102 when the portable device(s) 122 is located outside of the polling range of the vehicle 102.

Alternatively, if the polling signal response module 130 determines the portable device(s) 122 are within the polling range of the vehicle 102, the polling signal response module 130 sends the power saving command to the polling cycle control module 136 to utilize the second predetermined amount of power. Upon receipt of the power saving command, the polling cycle control module 136 sends a corresponding command to the power supply unit 108 to initiate a reduced polling mode in order to enable the supply of power to the communication device 112 to initiate a reduced number of polling signal transmissions within the predetermined time period relative to the predetermined number of polling signals transmitted within the predetermined time period in the default polling mode. Therefore, the communication device 112 consumes a reduced amount of power when the portable device(s) 122 is located outside of the polling range of the vehicle 102 as unnecessary power does not need to be supplied from the power source 110 in order to provide a more quicker determination that the portable device(s) 122 is exiting the polling range of the vehicle 102.

It is to be appreciated that various additional applications and embodiments will be apparent wherein the sensor activation control module 132, sensor measurement control module 134, and the polling cycle control module 136 can be utilized independently or jointly in order to provide commands to the power supply unit 108 to provide the first or second predetermined amount of power to the smart entry door handles 104a-104d and/or the communication device 112 of the vehicle 102. For example, in one embodiment, when the portable device(s) 122 are determined to be outside of the polling range of the vehicle 102, the sensor activation control module 132 can send a command to disable the lock sensors 116a-116d of all of the vehicle doors and unlock sensors 118b-118c of the passenger doors while the sensor activation control module 132 can send a command to reduce the power sent to the unlock sensor 118a of the driver's door 114a to initiate a reduced number of sensing measurements within a predetermined time period. In addition, the polling cycle control module 136 can send a command to supply a predetermined default level of power in order for the communication device 112 to provide a default (high) number of polling transmissions in order to quickly determine when the portable device(s) 122 enters the polling range of the vehicle 102.

II. Exemplary Methods

Figure 2:
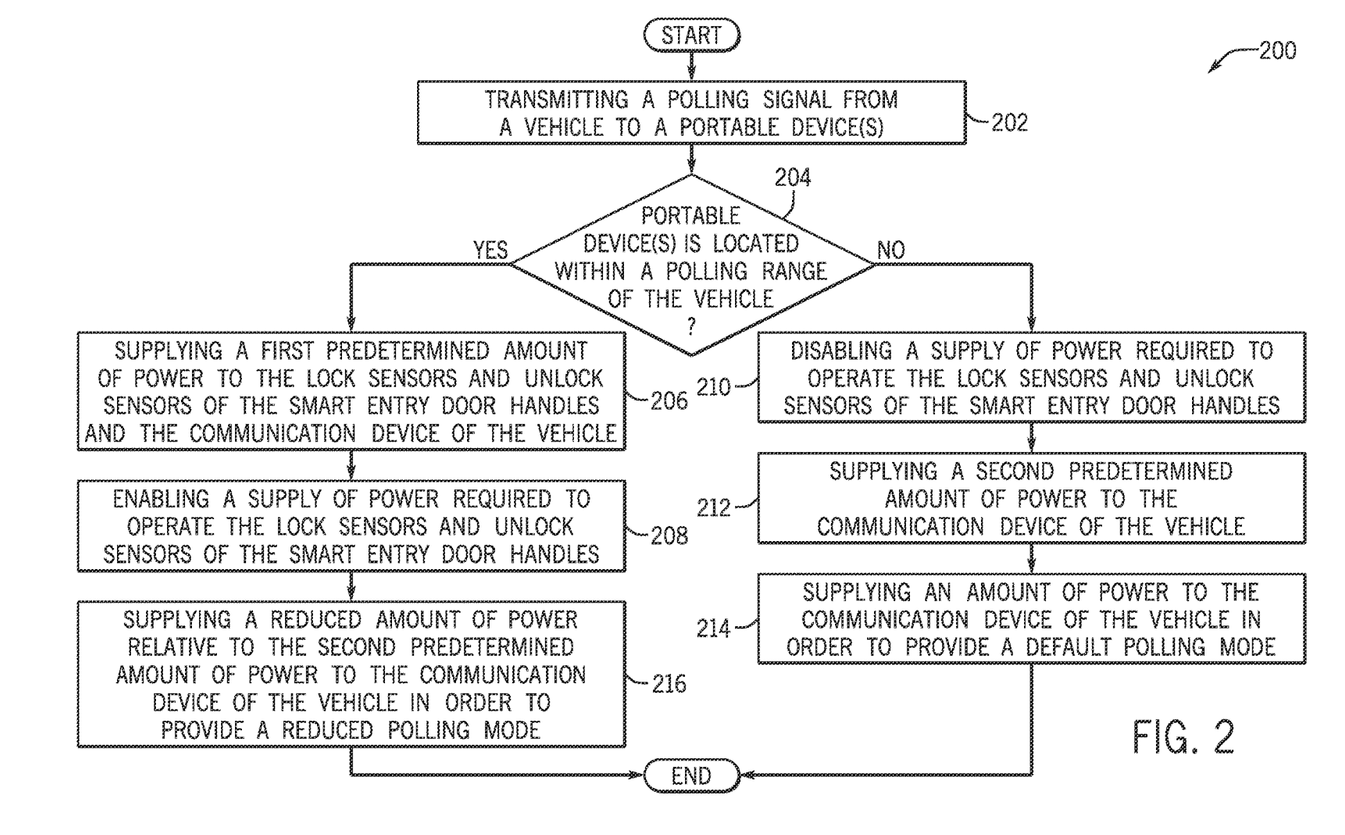
FIG. 2 is a process flow diagram of a method for reducing power consumption for smart entry door handles according to an exemplary embodiment of the present disclosure.

Referring now to FIG. 2, a process flow diagram of a method 200 for reducing power consumption for smart entry door handles 104a-104d according to an exemplary embodiment of the present disclosure. FIG. 2 will be described with reference to the components of FIG. 1 though it is to be appreciated that the method of FIG. 2 could be used with other systems and/or components. At block 202, the method includes transmitting a polling signal from the vehicle 102 to a portable device(s) 122. In one embodiment, the communication device 112 of the vehicle 102 continuously transmits a predetermined number of transmissions of the polling signal within a predetermined time period. The polling signal is sent to an area defined as the polling range, as discussed above.

At block 204, the method includes determining if the portable device(s) 122 is located within a polling range of the vehicle 102. In one embodiment, as discussed above, the polling signal response module 130 of the smart entry power control application 128 determines if the one or more portable device(s) 122 that are paired or that correspond to the vehicle 102 is located within a polling range of the vehicle 102 based on if the portable device(s) 122 receive the polling signal sent from the communication device 112 of the vehicle 102. If it is determined that the portable device(s) 122 is located within the polling range of the vehicle 102, at block 206, the method includes supplying a first predetermined amount of power to the lock sensors 116a-116d and unlock sensors 118a-118d of the smart entry door handles 104a-140d and the communication device 112 of the vehicle 102. In one embodiment, upon determining if the portable device(s) 122 is located within the polling range of the vehicle 102 the polling signal response module 130 sends a default operation command to the sensor activation control module 132 of the smart entry power control application 128 in order to enable the default power mode. In addition, the polling signal response module 130 sends a power saving command to the polling cycle control module 136 of the smart entry power control application 128 to enable a power saving mode.

At block 208, the method includes enabling a supply of power required to operate the lock sensors 116a-116d and unlock sensors 118a-118d of the smart entry door handles 104a-104d. In one embodiment, upon receipt of the default operation command from the polling signal response module 130, the sensor activation control module 132 sends a corresponding command to the power supply unit 108 to enable the supply of power to the lock sensors 116a-116d and unlock sensors 118a-118d.

If it is determined that the portable device(s) 122 is not located within (is located outside of) the polling range of the vehicle 102, at block 210, the method includes disabling a supply of power required to operate the lock sensors 116a-116d and the unlock sensors 118a-118d of the smart entry door handles 104a-104d. In one embodiment, when the polling signal response module 130 determines that the portable device(s) 122 are outside of the polling range of the vehicle 102, the polling signal response module 130 sends the power saving command to the sensor activation control module 132. Upon receipt of the power saving command, the sensor activation control module 132 sends a corresponding command to the power supply unit 108 to disable the supply of power to the lock sensors 116a-116d and unlock sensors 118a-118d. Therefore, the lock sensors 116a-116d and the unlock sensors 118a-118d are not activated and do not consume any unnecessary power from the power source 110 of the vehicle 102 when the (user(s) carrying) the portable device(s) 122 is not within the polling range of the vehicle 102.

At block 212, the method includes supplying a second predetermined amount of power to the communication device 112 of the vehicle 102. In one embodiment, upon determining that the portable device(s) 122 is located outside of the polling range of the vehicle 102, the polling signal response module 130 sends a default operation command to the polling cycle control module 136 of the smart entry power control application 128 in order to enable the default power mode. As discussed above, supplying a higher level of power when the second predetermined amount of power is provided to the communication device 112 can be beneficial in order to quickly determine when the portable device(s) 122 may enter the polling range (when the portable device(s) 122 are outside of the polling range of the vehicle 102) in order to efficiently enable the lock sensors 116a-116d, unlock sensors 118a-118d, and/or increase the frequency of sensing measurements that are performed by the unlock sensors 118a-118d.

At block 214, the method includes supplying an amount of power to the communication device 112 of the vehicle 102 in order to provide a default polling mode. In one embodiment, when the polling signal response module 130 determines that the portable device(s) 122 is located outside of the polling range of the vehicle 102, the polling signal response module 130 sends the default operation command to the polling cycle control module 136. Upon receipt of the default operation command, the polling cycle control module 136 sends a corresponding command to the power supply unit 108 to initiate the default polling mode. The power supply unit 108 responsively enables the supply of power to the communication device 112 in order to transmit the predetermined default number of transmissions of the polling signal within a predetermined time period.

However, if it is determined (at block 204) that the portable device(s) 122 is located within the polling range of the vehicle 102, at block 216, the method includes supplying a reduced amount of power relative to the second predetermined amount of power to the communication device 112 of the vehicle 102 in order to provide a reduced polling mode. In one embodiment, when the polling signal response module 130 determines the portable device(s) 122 is located within the polling range of the vehicle 102, the polling signal response module 130 sends the power saving command to the polling cycle control module 136. Upon receipt of the power saving command, the polling cycle control module 136 sends a corresponding command to the power supply unit 108 to initiate a reduced polling mode in order to enable the supply of power to the communication device 112 to initiate a reduced number of polling signal transmissions within the predetermined time period relative to the predetermined number of polling signals transmitted within the predetermined time period in the default polling mode (reduced relative to the amount of power supplied at block 214).

Figure 3:
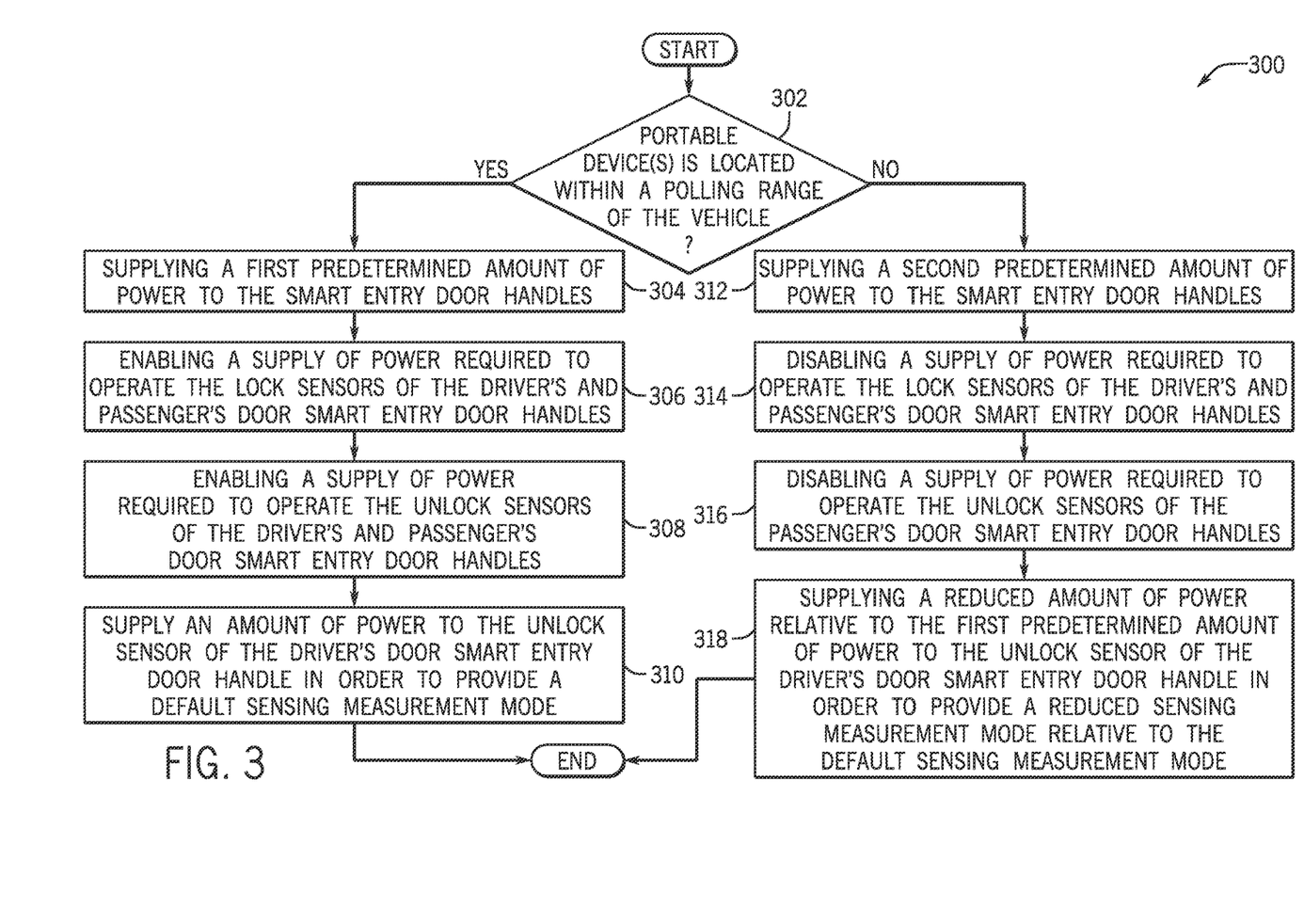
FIG. 3 is a process flow diagram of another method for reducing power consumption for smart entry door handles by controlling the frequency of sensing measurements and disabling power to sensors at specific vehicle doors according to an exemplary embodiment of the present disclosure.

Referring now to FIG. 3, a process flow diagram of another method 300 for reducing power consumption for smart entry door handles 104a-104d by controlling the frequency of sensing measurements and disabling power to sensors at specific vehicle doors according to an exemplary embodiment of the present disclosure. FIG. 3 will be described with reference to the components of FIG. 1. At block 302, the method includes determining if the portable device(s) 122 is located within a polling range of the vehicle 102. If it is determined that the portable device(s) 122 is located within the polling range of the vehicle 102, at block 304, the method includes supplying a first predetermined amount of power to the smart entry door handles 104a-140d. In one embodiment, upon determining if the portable device(s) 122 is located within the polling range of the vehicle 102 the polling signal response module 130 sends a default operation command to the sensor activation control module 132 and the sensor measurement control module 134 of the smart entry power control application 128 in order to enable the default power mode.

At block 306, the method includes enabling a supply of power required to operate the lock sensors 116a-116d of the driver's and passenger's door smart entry door handles 104a-104d. In one embodiment, when the polling signal response module 130 determines that the portable device(s) 122 is located within the polling range of the vehicle 102, the polling signal response module 130 sends the default operation command to the sensor activation control module 132. The sensor activation control module 132 sends a corresponding command to the power supply unit 108 in order to enable the supply of power to the driver's and passenger's door lock sensors 116a-116d.

At block 308, the method includes enabling a supply of power required to operate the unlock sensors 118a-118d of the driver's and passenger's door smart entry door handles 104a-104d. In one embodiment, when the polling signal response module 130 determines that the portable device(s) 122 is located within the polling range of the vehicle 102, the polling signal response module 130 sends the default operation command to the sensor activation control module 132. The sensor activation control module 132 sends a corresponding command to the power supply unit 108 in order to enable the supply of power to the driver's and passenger's door lock sensors 116a-116d.

At block 310, the method includes supplying an amount of power to the unlock sensor 118a of the driver's door smart entry door handle 104a in order to provide a default sensing measurement mode. In one embodiment, when the polling signal response module 130 determines that the portable device(s) 122 is located within (e.g., enters) the polling range of the vehicle 102, the polling signal response module 130 sends the default operation command to the sensor measurement control module 134. The sensor measurement control module 134 sends a corresponding command to the power supply unit 108 to enable the supply of power to the unlock sensor 118a that is necessary for the unlock sensor 118a to initiate the predetermined default number of sensing measurements within a predetermined period of time. Therefore, the sensor measurement control module 134 operates the unlock sensor 118a to provide a predetermined default number of sensing measurements within the period of time which are sufficient to activate the lock actuator 120a (to be put in the unlocked mode) of the smart entry door handle 104a and only consumes necessary power from the power source 110 of the vehicle 102 when the portable device(s) 122 are within the polling range of the vehicle 102.

If it is determined (at block 302) that the portable device(s) 122 is not located within the polling range of the vehicle 102, at block 312, the method includes supplying a second predetermined amount of power to the smart entry door handles 104a-140d. In one embodiment, upon determining if the portable device(s) 122 is located outside of the polling range of the vehicle 102 the polling signal response module 130 sends the power saving command to the sensor activation control module 132 and the sensor measurement control module 134 of the smart entry power control application 128 in order to enable the power saving mode.

At block 314, the method includes disabling a supply of power required to operate the lock sensors 116a-116d of the driver's and passenger's door smart entry door handles 104a-104d. In one embodiment, when the polling signal response module 130 determines that the portable device(s) 122 is located outside the polling range of the vehicle 102, the polling signal response module 130 sends the power saving command to the sensor activation control module 132. Upon receipt of the power saving command, the sensor activation control module 132 sends a corresponding command to the power supply unit 108 to initiate the power saving mode in order to disable the supply of power to the lock sensors 116a-116d.

At block 316, the method includes disabling a supply of power required to operate the unlock sensors 118b-118d of the passenger's door smart entry door handles 104b-104d. In one embodiment, when the polling signal response module 130 determines that the portable device(s) 122 is located outside the polling range of the vehicle 102, the polling signal response module 130 sends the power saving command to the sensor activation control module 132. Upon receipt of the power saving command, the sensor activation control module 132 sends a corresponding command to the power supply unit 108 to disable the supply of power to the unlock sensors 118b-118d. Therefore, in this exemplary embodiment, only the unlock sensor 118a of the driver's door smart entry door handle 104a remains enabled when the portable device(s) 122 is located outside of the polling range of the vehicle 102.

At block 318, the method includes supplying a reduced amount of power relative to the first predetermined amount of power to the unlock sensor 118a of the driver's door smart entry door handle 104a in order to provide a reduced sensing measurement mode relative to the default sensing measurement mode (reduced relative to the amount of power supplied at block 312). In one embodiment, when the polling signal response module 130 determines that the portable device(s) 122 is located outside the polling range of the vehicle 102, the polling signal response module 130 sends the power saving command to the sensor measurement control module 134. The sensor measurement control module 134 sends a corresponding command to the power supply unit 108 in order to reduce the supply of power to the unlock sensor 118a to initiate a reduced number of sensing measurements within the predetermined time period than in the default measurement mode for the smart entry door handle 104a. In other words, the unlock sensor 118a of the smart entry door handle 104a at the driver's door 114a is activated and remains activated at a lower reaction time relative to the default sensing measurement mode (discussed at block 312) when the portable device(s) 122 is located outside of the polling range of the vehicle 102 in order to reduce the consumption of energy that is supplied from the power source 110.

Figure 4:
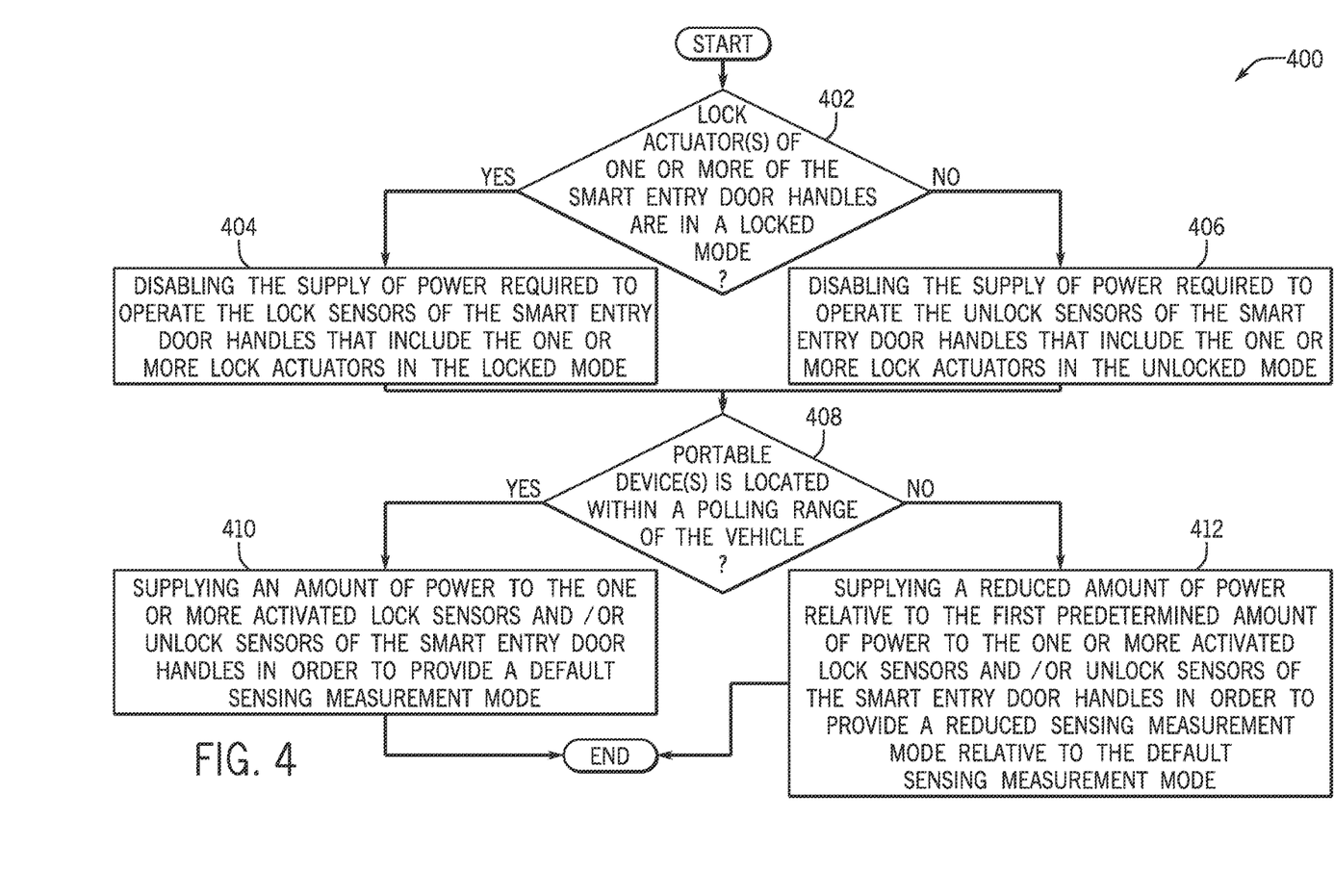
FIG. 4 is a process flow diagram of still another a method for reducing power consumption for smart entry door handles by disabling power to lock and unlock sensors individually and controlling the frequency of sensing measurements according to an exemplary embodiment of the present disclosure.

Referring now to FIG. 4, is a process flow diagram of still another method 400 for reducing power consumption for smart entry door handles 104a-104d by disabling power to lock and unlock sensors individually and controlling the frequency of sensing measurements according to an exemplary embodiment of the present disclosure. At block 402, the method includes determining if the lock actuator(s) 120a-120d of one or more of the smart entry door handles 104a-104d is in a locked mode. In one embodiment, the lock actuators 120a-120d of the one or more smart entry door handles 104a-104d sends a signal to the ECU 106 when the lock actuators 120a-120d are placed into the locked mode or unlocked mode based on the utilization of the lock sensors 116a-116d, unlock sensors 118a-118d, and/or input buttons on the portable device(s) 122, etc.

If it is determined that the lock actuator(s) 120a-120d of one or more of the smart entry door handles 104a-104d are in the locked mode, at block 404, the method includes disabling the supply of power required to operate the lock sensors 116a-116d of the smart entry door handles 104a-104d that include the one or more lock actuators 120a-120d in the locked mode. In one embodiment, the ECU 106 sends a lock actuation status command to the sensor activation control module 132 that includes the locked/unlocked mode status of the lock actuators 120a-120d. Upon receipt of the lock actuation status command from the ECU 106, the sensor activation control module 132 sends a command to the power supply unit 108 to disable the supply of power to the lock sensor(s) 116a-116d of the one or more smart entry door handles 104a-104d that include the lock actuator(s) 120a-120d that are in the locked mode. Therefore, only the unlock sensor(s) 118a-118d of the one or more smart entry door handles 104a-104d that include the lock actuator(s) 120a-120d that are in the locked mode remain activated. For example, if the lock actuators 120a and 120d are in the locked mode, the lock sensors 116a and 116d will be deactivated, and the unlock sensors 118a and 118d will be activated.

If it is determined that the lock actuator(s) 120a-120d of one or more of the smart entry door handles 104a-104d are not in the locked mode (are in the unlocked mode), at block 404, the method includes disabling the supply of power required to operate the unlock sensors 118a-118d of the smart entry door handles 104a-104d that include the one or more lock actuators 120a-120d in the unlocked mode. In one embodiment, upon receipt of the lock actuation status command (discussed above) from the ECU 106, the sensor activation control module 132 sends a command to the power supply unit 108 to disable the supply of power to the unlock sensor(s) 118a-118d of the one or more smart entry door handles 104a-104d that include the lock actuator(s) 120a-120d that are in the unlocked mode. Therefore, only the lock sensor(s) 116a-116d of the one or more smart entry door handles 104a-104d that include the lock actuator(s) 120a-120d that are in the unlocked mode remain activated. For example, if the lock actuators 120b and 120c are in the unlocked mode, the unlock sensors 118b and 118c will be deactivated, and the lock sensors 116b and 116c will be activated.

At block 408, it is determined if the portable device(s) 122 is located within a polling range of the vehicle 102. If it is determined that the portable device(s) 122 are located within a polling range of the vehicle 102, at block 410, the method includes supplying an amount of power to the one or more activated lock sensors 116a-116d and/or unlock sensors 118a-118d of the smart entry door handles 104a-104d in order to provide a default sensing measurement mode. In one embodiment, when the polling signal response module 130 determines that the portable device(s) 122 is located within the polling range of the vehicle 102, the polling signal response module 130 sends the default operation command to the sensor measurement control module 134. The sensor measurement control module 134 sends a corresponding command to the power supply unit 108 to enable the supply of power to the one or more activated lock sensors 116a-116d and/or unlock sensors 118a-118d (as determined at blocks 404 and 406) that is necessary for the one or more activated lock sensors to initiate the predetermined default number of sensing measurements within a predetermined period of time.

If it is determined (at block 408) that the portable device(s) 122 is not located within a polling range of the vehicle 102, at block 412, the method includes supplying a reduced amount of power relative to the first predetermined amount of power to the one or more activated lock sensors 116a-116d and/or unlock sensors 118a-118d of the smart entry door handles 104a-104d in order to provide a reduced sensing measurement mode relative to the default sensing measurement mode. In one embodiment, when the polling signal response module 130 determines that the portable device(s) 122 is located outside the polling range of the vehicle 102, the polling signal response module 130 sends the power saving command to the sensor measurement control module 134. The sensor measurement control module 134 sends a corresponding command to the power supply unit 108 in order to reduce the supply of power to the one or more activated lock sensors 116a-116d and/or unlock sensors 118a-118d (as determined at blocks 404 and 406) to initiate a reduced number of sensing measurements within the predetermined time period than in the default measurement mode (as discussed above with respect to block 410). For example, if the unlock sensors 118b and 118c are activated based on the lock actuators 120b and 120c being in the locked mode, when the portable device(s) 122 are outside of the polling range of the vehicle 102, the activated unlock sensors 118b and 118c remains activated at a lower reaction time than in the default sensing measurement mode (when the portable device(s) 122 are within the polling range of the vehicle 102) in order to reduce the consumption of energy that is supplied from the power source 110.

As discussed above, various embodiments of the smart entry power control system 100 can be utilized to reduce power consumption of the smart entry door handles 104a-104d of the vehicle 102. Also, a combination of the one or more methods discussed and/or various additional methods will be apparent wherein the components 130-136 of the smart entry power control application 128 can be utilized independently or jointly in order to provide commands to the power supply unit 108 to provide the first or second predetermined amount of power to the smart entry door handles 104a-104d and/or the communication device 112 of the vehicle 102. In addition, numerous components and technologies that have not been discussed herein can be utilized to compute operations associated with the smart entry power control application 128. It is to be appreciated that that in some embodiments, the smart entry power control system 100 can utilize a portable electronic device (i.e., smart phone, tablet, etc.) that include GPS sensors that interact with GPS (navigation) systems within the vehicle 102 to locate the portable device(s) 122.

The embodiments discussed herein may also be described and implemented in the context of non-transitory computer-readable storage medium storing computer-executable instructions. Non-transitory computer-readable storage media includes computer storage media and communication media. For example, flash memory drives, digital versatile discs (DVDs), compact discs (CDs), floppy disks, and tape cassettes. Non-transitory computer-readable storage media may include volatile and nonvolatile, removable and non-removable media implemented in any method or technology for storage of information such as computer readable instructions, data structures, modules or other data. Non-transitory computer readable storage media excludes transitory and propagated data signals.

It can be appreciated that various implementations of the above-disclosed and other features and functions, or alternatives or varieties thereof, can be desirably combined into many other different systems or applications. Also that various presently unforeseen or unanticipated alternatives, modifications, variations, or improvements therein can be subsequently made by those skilled in the art which are also intended to be encompassed by the following claims.

The invention claimed is:

1. A computer-implemented method for reducing power consumption for a smart entry door handle in a vehicle comprising:
   determining if a portable device is located within a polling range of the vehicle;
   supplying a first predetermined amount of power to the smart entry door handle if it is determined that the portable device is located within the polling range of the vehicle; and
   supplying a second predetermined amount of power to the smart entry door handle if it is determined that the portable device is located outside of the polling range of the vehicle;
   wherein supplying the second predetermined amount of power to the smart entry door handle includes supplying an amount of power to a communication device of the vehicle in order to provide a default polling mode,
   wherein the default polling mode includes the communication device of the vehicle transmitting a predetermined number of polling signals within a predetermined time period,
   wherein supplying the first predetermined amount of power to the smart entry door handle includes supplying a reduced amount of power relative to the second predetermined amount of power to the communication device of the vehicle in order to provide a reduced polling mode, and
   wherein the reduced polling mode includes the communication device of the vehicle transmitting a reduced number of polling signals within the predetermined time period relative to the predetermined number of polling signals transmitted within the predetermined time period in the default polling mode.

2. The computer-implemented method of claim 1, wherein supplying the first predetermined amount of power to the smart entry door handle includes enabling a supply of power required to operate a touch sensor of the smart entry door handle.

3. The computer-implemented method of claim 2, wherein supplying the second predetermined amount of power to the smart entry door handle includes disabling the supply of power required to operate the touch sensor of the smart entry door handle.

4. The computer-implemented method of claim 3,
   wherein supplying the first predetermined amount of power to the smart entry door handle includes supplying an amount of power to the touch sensor of the smart entry door handle in order to provide a default sensing measurement mode,
   wherein the default sensing measurement mode includes the touch sensor initiating a predetermined number of sensing measurements within a predetermined time period which are sufficient to activate a lock actuator of the smart entry door handle.

5. The computer-implemented method of claim 4, wherein disabling the supply of power required to operate the touch sensor includes at least one of:
   disabling the supply of power required to operate a lock touch sensor of the smart entry door handle when a lock actuator of the smart entry door handle is in a locked mode, and
   disabling the supply of power required to operate an unlock touch sensor of the smart entry door handle when the lock actuator of the smart entry door handle is in an unlocked mode.

6. The computer-implemented method of claim 5, wherein disabling the supply of power required to operate the touch sensor includes:
   disabling the supply of power required to operate the lock touch sensor of the smart entry door handle on a driver's door of the vehicle, and
   disabling the supply of power required to operate the lock touch sensor and the unlock touch sensor of the smart entry door handle on a passenger's door of the vehicle.

7. The computer-implemented method of claim 2,
   wherein supplying the first predetermined amount of power to the smart entry door handle includes supplying an amount of power to the touch sensor of the smart entry door handle in order to provide a default sensing measurement mode,
   wherein the default sensing measurement mode includes the touch sensor initiating a predetermined number of sensing measurements within a predetermined time period which are sufficient to activate a lock actuator of the smart entry door handle,
   wherein supplying the second predetermined amount of power to the smart entry door handle includes supplying a reduced amount of power relative to the first predetermined amount of power to the touch sensor of the smart entry door handle in order to provide a reduced sensing measurement mode, wherein the reduced sensing measurement mode includes the touch sensor initiating a reduced number of sensing measurements within the predetermined time period relative to the predetermined number of sensing measurements initiated within the predetermined time period in the default sensing measurement mode.

8. The computer-implemented method of claim 7, wherein:
the touch sensor includes a lock touch sensor and an unlock touch sensor; and
supplying the second predetermined amount of power to the smart entry door handle includes supplying a reduced amount of power relative to the first predetermined amount of power to the unlock touch sensor of the smart entry door handle on a driver's door in order to provide a reduced sensing measurement mode relative to the default sensing measurement mode.

9. A system for reducing power consumption for a smart entry door handle in a vehicle comprising:
a smart entry power control application for controlling components of the smart entry door handle;
a polling signal response module of the smart entry power control application for determining if a portable device is located within a polling range of the vehicle; and
a power supply unit of the vehicle for supplying a first predetermined amount of power to the smart entry door handle if the polling signal response module determines that the portable device is located within the polling range of the vehicle;
wherein the power supply unit of the vehicle supplies a second predetermined amount of power to the smart entry door handle if the polling signal response module determines that the portable device is located outside of the polling range of the vehicle,
wherein the system further includes a polling cycle control module of the smart entry power control application that sends a command to the power supply unit to supply the second predetermined amount of power to the smart entry door handle to supply an amount of power to a communication device of the vehicle in order to provide a default polling mode;
wherein the default polling mode includes the communication device of the vehicle transmitting a predetermined number of polling signals within a predetermined time period,
wherein the polling cycle control module sends the command to the power supply unit to provide the first predetermined amount of power to the smart entry door handle to reduce the amount of power supplied to the communication device in order to provide a reduced polling mode, and
wherein the reduced polling mode includes the communication device of the vehicle transmitting a reduced number of polling signals within the predetermined time period relative to the predetermined number of polling signals transmitted within the predetermined time period in the default polling mode.

10. The system of claim 9, further including a sensor activation control module of the smart entry power control application that sends a command to the power supply unit to supply the first predetermined amount of power to the smart entry door handle to enable the supply of power required to operate a touch sensor of the smart entry door handle.

11. The system of claim 10, wherein the sensor activation control module sends a command to the power supply unit to supply the second predetermined amount of power to the smart entry door handle to disable the supply of power required to operate the touch sensor of the smart entry door handle.

12. The system of claim 9, further including a sensor measurement control module of the smart entry power control application that sends a command to the power supply unit to supply the first predetermined amount of power to the smart entry door handle to supply an amount of power in order to provide a default sensing measurement mode,
wherein the default sensing measurement mode includes a touch sensor initiating a predetermined number of sensing measurements within a predetermined time period which are sufficient to activate a lock actuator of the smart entry door handle.

13. The system of claim 12,
wherein the sensor measurement control module sends the command to the power supply unit to supply the second predetermined amount of power to reduce the amount of power supplied to the touch sensor in order to provide a reduced sensing measurement mode,
wherein the reduced sensing measurement mode includes the touch sensor initiating a reduced number of sensing measurements within the predetermined time period than in the default sensing measurement mode.

14. A non-transitory computer-readable storage medium storing instructions that, when executed by a computer, causes the computer to perform a method, comprising:
determining if a portable device is located within a polling range of a vehicle;
supplying a first predetermined amount of power to a smart entry door handle if it is determined that the portable device is located within the polling range of the vehicle; and
supplying a second predetermined amount of power to the smart entry door handle if it is determined that the portable device is located outside of the polling range of the vehicle;
wherein supplying the second predetermined amount of power to the smart entry door handle includes supplying an amount of power to a communication device of the vehicle in order to provide a default polling mode,
wherein the default polling mode includes the communication device of the vehicle transmitting a predetermined number of polling signals within a predetermined time period,
wherein supplying the first predetermined amount of power to the smart entry door handle includes supplying a reduced amount of power relative to the second predetermined amount of power to the communication device of the vehicle in order to provide a reduced polling mode, and
wherein the reduced polling mode includes the communication device of the vehicle transmitting a reduced number of polling signals within the predetermined time period relative to the predetermined number of polling signals transmitted within the predetermined time period in the default polling mode.

15. The non-transitory computer-readable storage medium of claim 14, wherein supplying the second predetermined amount of power to the smart entry door handle includes:
disabling the supply of power required to operate a lock touch sensor of the smart entry door handle on a driver's door of the vehicle, and disabling a supply of power required to operate the lock touch sensor and an unlock touch sensor of the smart entry door handle on a passenger's door of the vehicle.

16. The non-transitory computer-readable storage medium of claim 14, wherein supplying the second predetermined amount of power to the smart entry door handle includes supplying a reduced amount of power relative to the first predetermined amount of power to an unlock touch sensor of the smart entry door handle of a driver's door.

\* \* \* \* \*